United States Patent [19]
Bowers et al.

[11] 3,866,704
[45] Feb. 18, 1975

[54] BATTERY HOLDDOWN

[75] Inventors: Bernard P. Bowers, Ontelaunee Twsp., Berks Co.; Delight E. Breidegam, Jr., Kutztown, Berks Co., both of Pa.

[73] Assignee: East Penn Manufacturing Company, Inc., Lyon Station, Pa.

[22] Filed: Feb. 8, 1973

[21] Appl. No.: 330,516

[52] U.S. Cl. ............................. 180/68.5, 248/361
[51] Int. Cl. ............................................. B60r 18/02
[58] Field of Search.................... 180/68.5; 248/361

[56] References Cited
UNITED STATES PATENTS

| | | | |
|---|---|---|---|
| 1,867,735 | 7/1932 | Dunzweiller | 180/68.5 |
| 2,451,532 | 10/1948 | Brown | 180/68.5 |
| 2,613,755 | 10/1952 | Newby et al. | 180/68.5 |
| 2,979,146 | 4/1961 | Fogle | 180/68.5 |
| 2,981,352 | 4/1961 | Jilbert | 180/68.5 |
| 3,557,895 | 1/1971 | Thomas | 180/68.5 |

*Primary Examiner*—David Schonberg
*Assistant Examiner*—David M. Mitchell
*Attorney, Agent, or Firm*—Zachary T. Wobensmith

[57] ABSTRACT

A storage battery holddown is disclosed having a transverse bar with end holder brackets secured at each end, the end brackets having horizontal flanges for engagement with the battery case and vertical flanges extending downwardly along and close to opposite sides of the battery case. The vertical flanges have struck out strips extending substantially their length for engagement by attaching or clamping devices. One form of clamping device is a clip for engagement with a vertical threaded bolt. Another form of clamping device includes an adapter clip for vertically adjustable engagement by one leg of an L-shaped bracket, the other leg of which has a slot for reception of a clamping bolt. Another form of clamping is accomplished by a different disposition of the L-shaped bracket.

6 Claims, 10 Drawing Figures

PATENTED FEB 18 1975 3,866,704
SHEET 1 OF 3
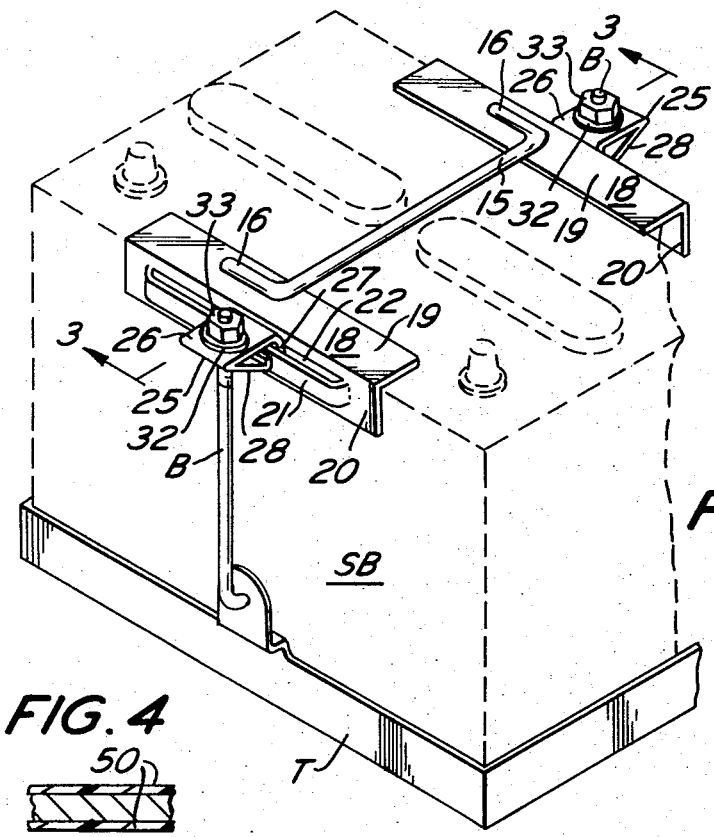
FIG.1
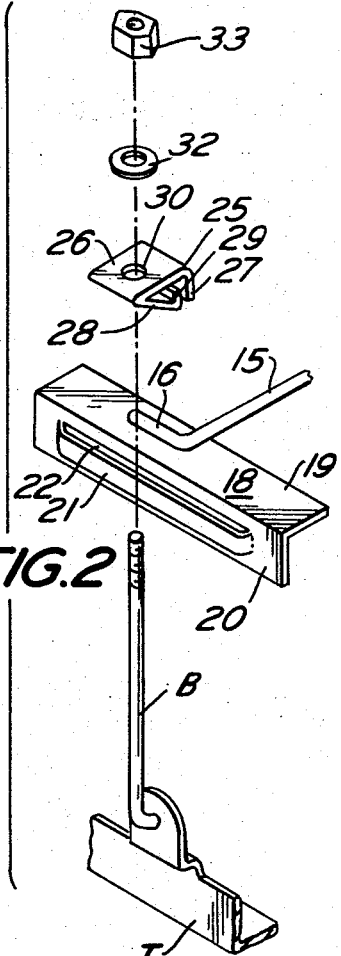
FIG.2
FIG.4
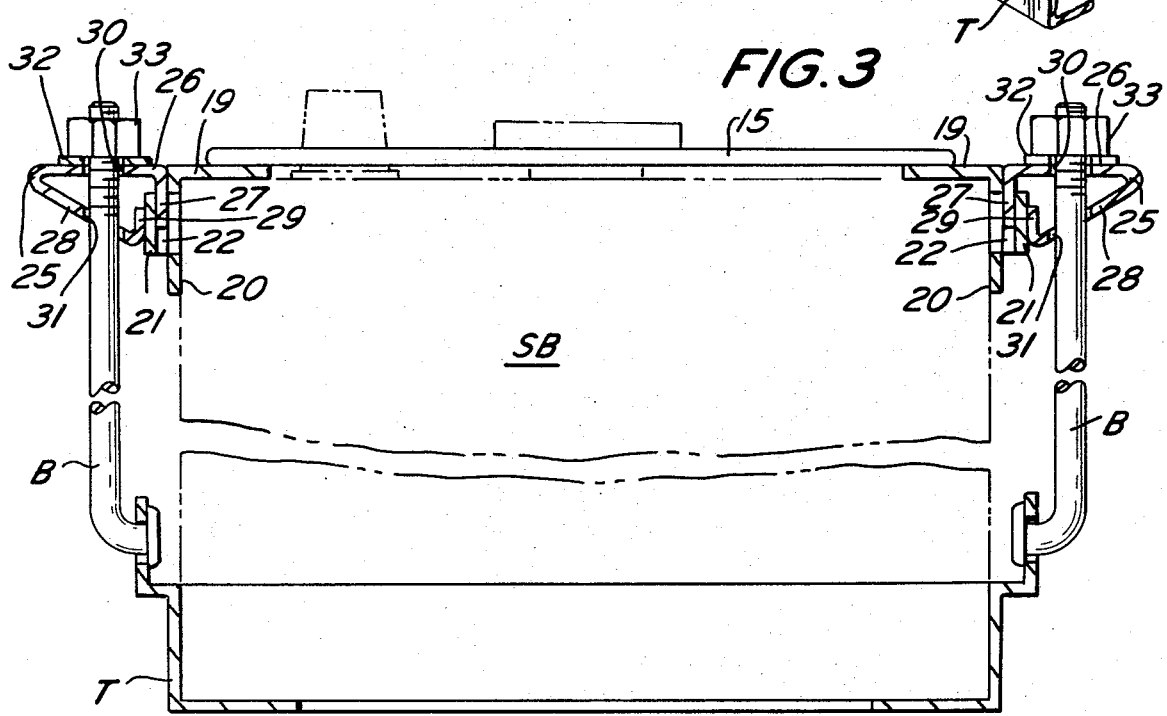
FIG.3

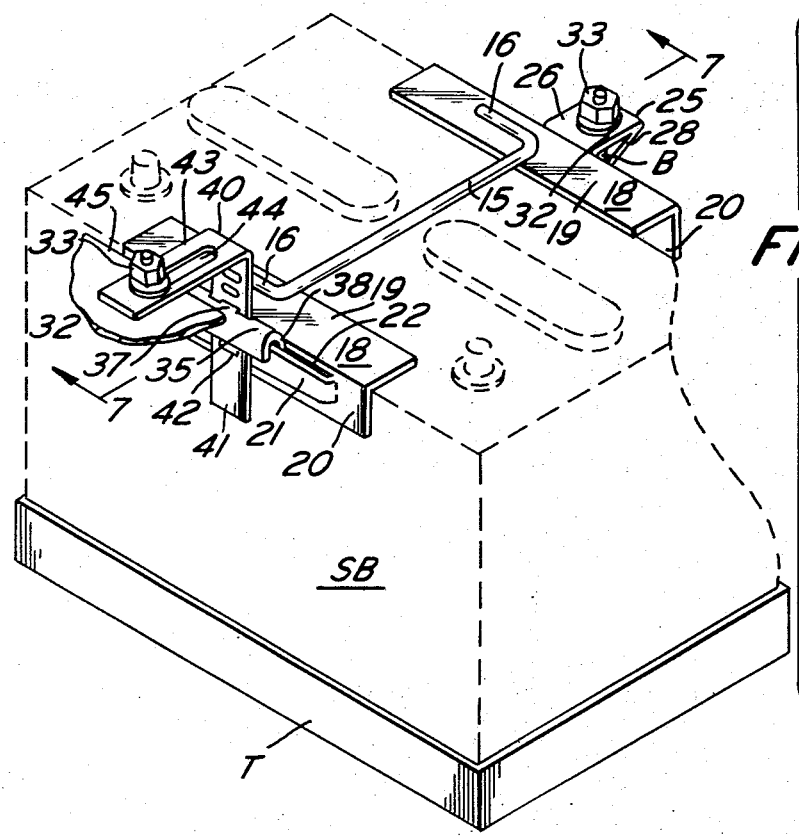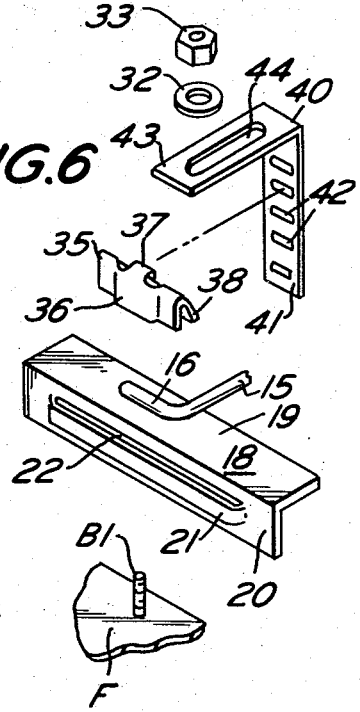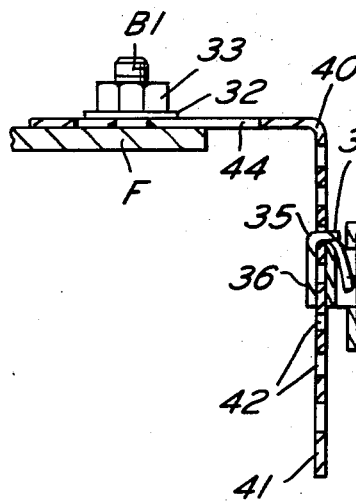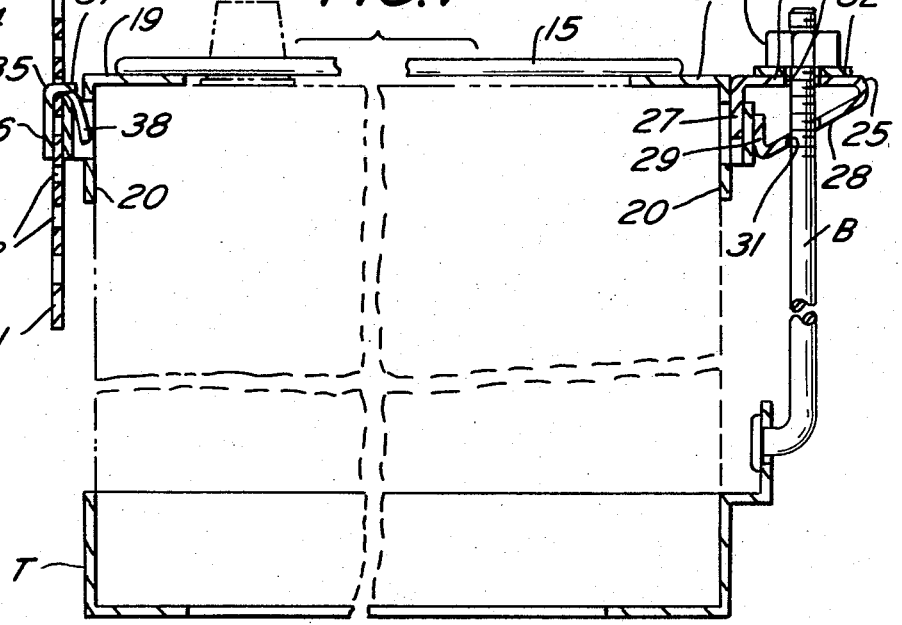

PATENTED FEB18 1975 3,866,704

BATTERY HOLDDOWN

BACKGROUND OF THE INVENTION

1. Field of the Invention

This invention relates to holddown structure for storage batteries of motor vehicles and boats.

2. Description of the Prior Art

Various types of battery holddown structure have heretofore been proposed.

The use of frames engaging the battery case is shown in the U.S. patents to Holman, U.S. Pat. No. 2,415,284, Hatfield U.S. Pat. No. 2,514,056, and Buhl, U.S. Pat. No. 2,956,101. These devices lack adaptability to the many sizes and shapes of batteries now employed as well as the different provisions made by car manufacturers for receiving the battery.

It has also been proposed to use various types of clamps engaging the battery case. Examples are to be found in the U.S. patents to Hick, U.S. Pat. No. 1,636,562; Taylor, U.S. Pat. No. 1,772,847; Dunzweiler, U.S. Pat. No. 1,867,735; Grieg, U.S. Pat. No. 2,196,578; Hildreth, U.S. Pat. No. 2,870,855; Hall, U.S. Pat. No. 2,994,395; Paller, U.S. Pat. No. 3,125,177; Brazell U.S. Pat. No. 3,167,458; Gass, U.S. Pat. No. 3,254,736; Bauschard, U.S. Pat. No. 3,379,400; Hysmith, U.S. Pat. No. 3,498,400; and Bauschard, U.S. Pat. No. 3,581,837. While these structures were useful for specific batteries and battery receiving trays they were unsuited for many of the present requirements, particularly where only one side of the mounting employs a side tie rod.

It has also been proposed as in the U.S. patents to Merkle, U.S. Pat. No. 2,849,074; Bergman, U.S. Pat. No. 2,853,143; Anderson, U.S. Pat. No. 3,298,454; and Thomas, U.S. Pat. No. 3,557,895, to employ a central bar engaging the battery or its case and clamping the bar in position. The structures of Merkle, Bergman and Anderson are not suited for many types of batteries and battery receiving trays without structural modifications or adaptations to suit particular conditions. Thomas shows a structure which has adaptability to meet a number of the conditions presently encountered, but is unsuited for several current models of motor vehicles. The structure of Thomas, also, has a cross bar whose flanges extend upwardly to an undesired extent and this structure is difficult and unduly costly to construct.

The battery holddown of the present invention overcomes the shortcomings of the holddowns heretofore available, has a wider range of adaptability to the various batteries and battery receiving trays now encountered and makes available a replacement kit which meets the needs of many users.

SUMMARY OF THE INVENTION

In accordance with the invention a battery holddown is provided which includes a transverse bar having secured at each end, end holder brackets of angle or L-shape in cross section with horizontal portions to engage the top of the battery case and vertical portions to extend down the side of the battery case, the vertical portions each having substantially along its entire length a struck out strip for engagement by an attaching element, such as a clip or bracket to adapt the holddown to the specific requirements such as securement to a vertical clamp bolt, or attachment to the vehicle frame.

It is the principal object of the invention to provide a battery retainer for holding down a battery which has a wider range of usefulness than the devices presently available for this purpose.

It is a further object of the invention to provide a battery retainer which can be packaged in kit form with the kit containing components adapted for a wider range of retention requirements than has heretofore been available.

It is a further object of the invention to provide a battery retainer of the character aforesaid which is simple in construction yet sturdy and reliable in operation.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part hereof, in which:

FIG. 1 is a view in perspective of an embodiment of the invention for retaining a battery to two conventional vertical clamping bolts;

FIG. 2 is an exploded perspective view of the clamping structure of FIG. 1 on one side of the battery;

FIG. 3 is a vertical sectional view taken on the line 3—3 of FIG. 1;

FIG. 4 is a fragmentary sectional view, greatly enlarged, illustrating the protective coating applied to the various components;

FIG. 5 is a view in perspective of an embodiment of the invention for retaining a battery on one side as in FIG. 1 and on the other side to a portion of the frame of a vehicle;

FIG. 6 is an exploded perspective view of the clamping structure at the left of FIG. 5;

FIG. 7 is a vertical sectional view taken approximately on the line 7—7 of FIG. 5;

Figure 8:
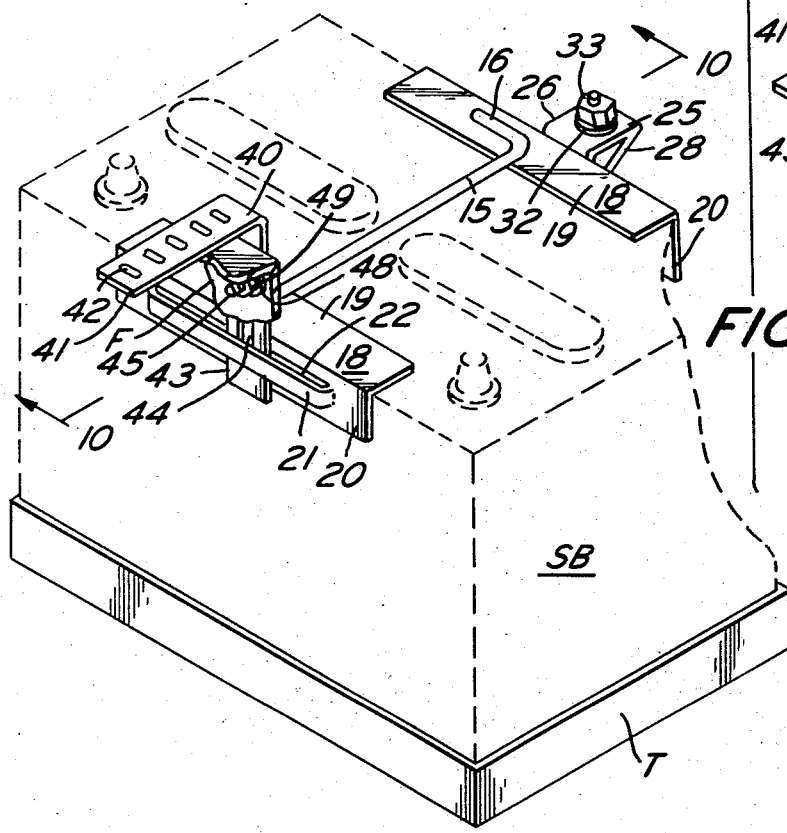
FIG. 8 is a view in perspective of another embodiment of the invention for retaining a battery on one side as in FIG. 1 and on the other side to a portion of the frame of a different vehicle.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF THE PREFERRED EMBODIMENT

Referring now more particularly to the drawings, and specifically to FIGS. 1 to 4 inclusive, a storage battery SB is shown, supported in a tray or frame T from which upright bolts B extend in a well known manner.

The holddown structure shown, for use with a pair of upright bolts B, includes a cross rod or bar 15 having its ends 16 disposed in the same plane as the main portion of the bar 15. End holder brackets 18 are provided of angle or L-shape in cross section having inwardly extending horizontal flange portions 19 and vertical downwardly extending flange portions 20 with the ends 16 of the rod 15 welded or otherwise secured to the top and outer faces of the horizontal portions 19. The inner faces of the horizontal portions 19 of the end holder brackets 18 are adapted to engage the cover or top of the case of the battery SB with the inner faces of the vertical portions 20 engaged with or close to the opposite side walls of the case of the battery SB to prevent sidewise movement.

The side flange portions 20 are preferably provided, along substantially their entire lengths with struck-out strips 21 which provide between the strips 21 and the remainder of the side flange portions 20 horizontally elongated spaces 22 of predetermined transverse horizontal dimension for the reception of clamping elements to be described.

In the embodiment of the invention shown in FIGS. 1, 2, and 3, clips 25 are employed each having a flat top portion 26, with a rear vertically extending rib 27 of a thickness in finished condition for reception in one of the spaces 22 and a downwardly inclined wall portion 28 with an upwardly extending vertical terminal rib 29 for engagement with the outer face of the strip 21. The clip 25 has an opening 30 in the flat top portion 26 and an axially aligned and larger opening 31 in the inclined wall 28 through which the bolt B extends. A washer 32 and nut 33 can be mounted on the upper end of the bolt B. Upon tightening of the nut 33, with the rib 27 in the space 22 and engaging the inner face of the strip 21, and the rib 29 engaging the outer face of the strip 21, the force applied on the clip 25 urges it downwardly and transmits, from the clip 25, a downward holding force on the end holder bracket 18. The holddown action will be the same at each end holder bracket 18.

It will be noted that the clip 25 can be located as desired, along the end holder bracket 18 to accommodate different locations of the bolts B, with a wide range of adjustment available along the strip 21 and space 22 because of the length of the strip 21 and space 22.

The structure just described will accommodate a great number of the demands for different batteries and for different tray constructions.

Referring now to FIGS. 5, 6 and 7, it may be noted that in certain battery installations now in use a bolt B is found only at one side and at the other side the body F of the vehicle has a vertical bolt B1 offset from the battery B.

For battery installations of this type, an adapter clip 35 can be employed. The clip 35 is of inverted V-shape in cross section at its ends with an inclined wall portion 36 having a central tongue 37 and spaced side wall portions 38.

It will be noted that the adapter clip 35 can be mounted on the strip 21 with the side wall portions 38 extending downwardly in the space 22 and with the tongue 37 facing toward the base of the battery SB.

An L-shaped securing bracket 40 is provided having one leg 41 with transverse slots 42 for selective engagement on the tongue 37 and disposition downwardly along the outside of the strip 21 and another leg 43 in a plane normal to the leg 41. The leg 43 is provided with an elongated slot 44 extending away from the leg 41.

The securing bracket 40 is positioned at the desired elevation on the tongue 37 of the adapter clip 35 and the slot 44 disposed with the bolt B1 extending upwardly therethrough. A washer 32 and nut 33 can then be applied on the bolt B1 and the nut 33 tightened to hold down the leg 43. The downward force applied through the leg 43 is effective through the leg 41, tongue 37 and adapter clip 35 against the strip 21 to secure the battery SB on this side. The adapter clip 35 with the securing bracket 40 engaged on the tongue 37 can be freely moved to the desired location along the strip 21 to accommodate to the location of the bolt B1 along the side of the case of the battery SB.

The other side of the case of the battery SB is held down in the manner previously described in connection with FIGS. 1, 2, and 3.

Figure 9:
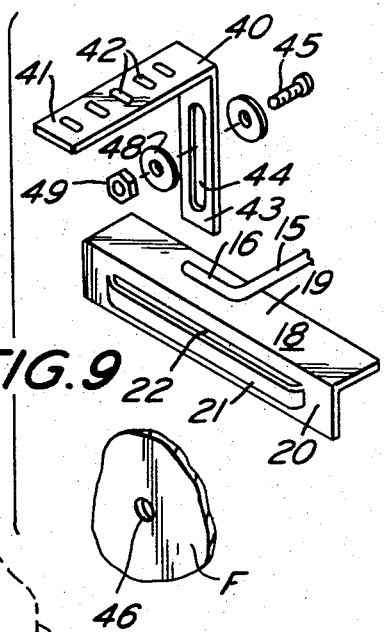
FIG. 9 is an exploded perspective view of the clamping structure on the left of FIG. 8.
Figure 10:
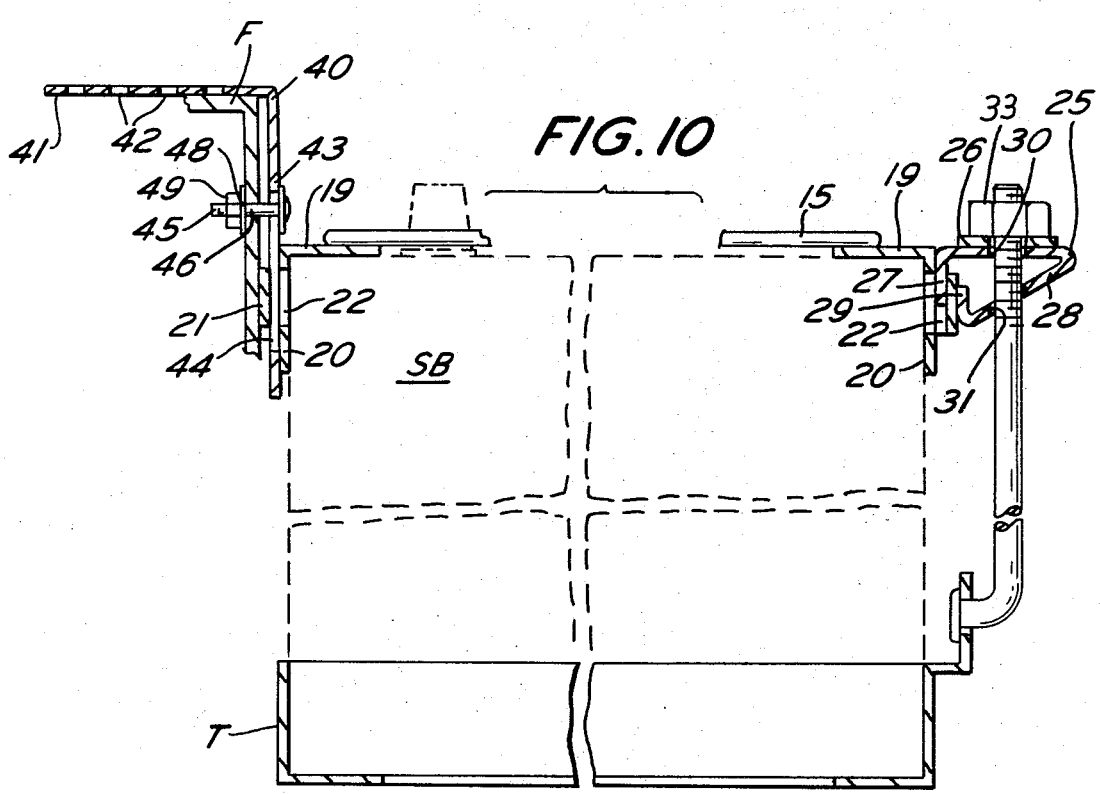
FIG. 10 is a vertical sectional view taken approximately on the line 10—10 of FIG. 8.

Referring now to FIGS. 8, 9 and 10 it may be noted that in certain battery installations the body of the vehicle has no vertical bolt B1 and securement to a vertical wall is required.

In this instance, the securing bracket 40 can be forced through or disposed downwardly through the space 22 on the inside of the strip 21. The thickness of the bracket 40, in finished form can be related to the width of the space 22 in the finished form of the end holder brackets 18 for frictional engagement.

A bolt 45 extended through the bolt 44 and on opening 46 in the body of the vehicle and retained by a washer 48 and nut 49 holds bracket 40 in place.

The leg 41 of the holder bracket 40 can engage another horizontal portion of the body of the vehicle, and if desired, a portion of the leg 41 can be bent to a noninterfering position.

The cross rod 15 and its end brackets 18, the clips 25, the adapter clip 35 and the bracket 40 are preferably provided with a heavy enclosing coating 50 of any desired tough adherent corrosion-resistant waterproof electrical-resistant synthetic plastic to protect the same against battery acid, grease and oil and road dirt.

A kit useful for motorists and repairmen can be assembled and packaged to include a cross rod 15 and its end brackets 18, two clips 25, one adapter clip 35 and one bracket 40.

We claim:

1. A battery holddown device which comprises a cross rod, holder brackets of inverted L-shape in cross section with horizontal flanges having upper faces to which the ends of said cross rod are secured in fixed relation, said holder brackets having lower faces for engagement with a battery case, said holder brackets having integral vertical flanges extending downwardly from said horizontal flanges with inner faces for engagement with said battery case, each of said vertical flanges having an outer face with a strip therealong for the major portion of the length of the holder bracket offset outwardly from the outer face to provide a vertical space between the strip and the vertical flange, and members selectively positioned along and engaging each of said holder brackets for holding said holder brackets in engagement with a battery case, said last mentioned members each having an upper portion adapted to be held against movement from exteriorly of the holddown device and a portion extending vertically downwardly therefrom and in said space, at least one of said members comprising a clip having a portion in clamped engagement with an outer face of said strip, said clip having said upper portion horizontally disposed, said vertically downwardly extending portion extending from one edge of said upper portion, a downwardly and inwardly inclined bracing wall portion extending from the other edge of said upper portion, a vertically upwardly extending terminal rib providing the portion in clamped engagement with the outer face of said strip and extending upwardly from said bracing wall portion, and said upper portion of said clip and said downwardly inclined bracing wall portions having openings for the reception of a vertical clamping bolt.

2. A battery holddown device as defined in claim 1 in which said downwardly extending portion of said clip is a vertical end rib for engagement in said space, and said portion in clamped engagement with said strip extends upwardly.

3. A battery holddown device as defined in claim 1 in which the other of said members comprises an adapter clip engageable with said strip and having a portion in said space and a portion engaged with the outer face of said strip, and a clamping bracket having a pair of legs one for adjustable engagement with said adapter clip for adjustment to a desired vertical location.

4. A battery holddown device as defined in claim 1 in which the other of said members comprises a clamping bracket having a pair of legs at an angle to each other and at least one of which has at least one opening therethrough, and one of said legs extends downwardly outside said strip.

5. A battery holddown device as defined in claim 1 in which the other of said members comprises a clamping bracket having a leg with an opening therethrough, and said leg provides the downwardly extending portion in said space.

6. A battery holddown device as defined in claim 1 in which said adapter clip has a tongue portion, said clamping bracket has in one leg a plurality of slots for selective engagement by said tongue portion, said clamping bracket in its other leg has an elongated slot for securement.

* * * * *